United States Patent
Itoh et al.

(10) Patent No.: US 11,698,142 B2
(45) Date of Patent: Jul. 11, 2023

(54) ELECTROMAGNETIC VALVE

(71) Applicant: CKD CORPORATION, Komaki (JP)

(72) Inventors: Shinji Itoh, Komaki (JP); Shotaro Hatanaka, Komaki (JP); Yasunari Azuma, Komaki (JP); Yasunari Ishihara, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/672,579

(22) Filed: Feb. 15, 2022

(65) Prior Publication Data

US 2022/0268369 A1    Aug. 25, 2022

(30) Foreign Application Priority Data

Feb. 19, 2021    (JP) .................................. 2021-025573

(51) Int. Cl.
*F16K 31/06* (2006.01)
*F16K 27/06* (2006.01)

(52) U.S. Cl.
CPC ........ *F16K 27/065* (2013.01); *F16K 31/0644* (2013.01)

(58) Field of Classification Search
CPC ............. F16K 31/0627; F16K 31/0675; F16K 27/029; H01F 41/005; H01F 41/02; H01F 41/127
See application file for complete search history.

(56) References Cited

U.S. PATENT DOCUMENTS

| | | | | |
|---|---|---|---|---|
| 5,414,398 A | * | 5/1995 | Schumacher | ....... F16K 27/0263 |
| | | | | 251/129.21 |
| 5,423,117 A | * | 6/1995 | Okada | ...................... H01F 7/06 |
| | | | | 29/605 |
| 9,545,902 B2 | * | 1/2017 | Kodama | ............... H01F 41/076 |
| 10,865,889 B2 | * | 12/2020 | Itoh | ..................... F15B 13/0405 |

FOREIGN PATENT DOCUMENTS

| | | | | |
|---|---|---|---|---|
| EP | 3382245 A1 | * | 10/2018 | ............... F16K 1/36 |
| JP | H06-2621 U | | 1/1994 | |

* cited by examiner

*Primary Examiner* — Hailey K. Do
(74) *Attorney, Agent, or Firm* — J. Miguel Hernandez; James R. Gourley; Carstens, Allen & Gourley, LLP (57) ABSTRACT

A solenoid unit of an electromagnetic valve includes a coil, a bobbin, a fixed iron core, a movable iron core, an urging spring, a magnetic frame, and a molded plastic part. The magnetic frame includes a frame end wall, two frame arms, and an internal thread hole, to which the fixed iron core is threaded. A tubular projection protrudes from an end face of the frame end wall that is on a side opposite to the bobbin. The projection forms part of the internal thread hole. The molded plastic part includes a molded end wall, which covers the frame end wall, and a molded peripheral wall. The molded end wall includes a connecting hole that is continuous with the internal thread hole. The connecting hole includes a groove in an inner circumferential surface. The groove extends along an outer circumferential surface of the projection.

7 Claims, 4 Drawing Sheets

ELECTROMAGNETIC VALVE

CROSS-REFERENCE TO RELATED APPLICATIONS

This application claims priority to Japanese Patent Application No. 2021-025573 filed on Feb. 19, 2021. Each application, publication, and patent listed in this paragraph are hereby incorporated by reference in their entireties.

BACKGROUND

1. Field

The present disclosure relates to an electromagnetic valve.

2. Description of Related Art

For example, Japanese Laid-Open Utility Model Publication No. 6-2621 discloses an electromagnetic valve. Such an electromagnetic valve includes a valve member, which switches passages provided in a body, and a solenoid unit, which moves the valve member. The solenoid unit includes a coil, a bobbin around which the coil is wound, a fixed iron core arranged inside the bobbin, a movable iron core, and an urging spring that urges the movable iron core away from the fixed iron core. When power is supplied to the coil, attractive force is generated in the fixed iron core. The generated attractive force attracts the movable iron core toward the fixed iron core. Further, the solenoid unit includes a magnetic frame and a molded plastic part. The magnetic frame is located on the outer side of the bobbin and cooperates with the fixed iron core and the movable iron core to generate a magnetic circuit. The molded plastic part integrates the magnetic frame, the bobbin, and the coil together.

As described above, the magnetic frame, the bobbin, and the coil are integrated with the molded plastic part in the electromagnetic valve. In this configuration, injection molding is performed in which the mold is filled with plastic while the magnetic frame, the bobbin, and the coil are arranged in the mold. At this time, if the positioning of the magnetic frame is unstable in the mold, the molding pressure of the plastic in the mold may displace the magnetic frame from the predetermined position. In such a case, the magnetic frame is integrated with the bobbin and the coil while being displaced from the predetermined position with respect to the bobbin and the coil with the molded plastic part. This destabilizes the magnetic circuit generated by the cooperation of the magnetic frame with the fixed iron core and the movable iron core around the coil, which may reduce the magnetic efficiency. If the magnetic efficiency is reduced, it is difficult to obtain a high attractive force in the fixed iron core.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an electromagnetic valve is provided that includes a body including passages, a valve member configured to switch the passages, and a solenoid unit configured to move the valve member. The solenoid unit includes a coil, a tubular bobbin about which the coil is wound, a fixed iron core arranged on an inner side of the bobbin, a movable iron core, an urging spring, a magnetic frame, and a molded plastic part. The movable iron core is configured to be attracted to the fixed iron core by attractive force that is generated in the fixed iron core when power is supplied to the coil. The urging spring is configured to urge the movable iron core away from the fixed iron core. The magnetic frame is located on an outer side of the bobbin. The magnetic frame cooperates with the fixed iron core and the movable iron core so as to generate a magnetic circuit around the coil. The molded plastic part integrates the magnetic frame, the bobbin, and the coil together. The magnetic frame includes a frame end wall that is adjacent to the bobbin in an axial direction of the bobbin, two frame arms located on the outer side of the bobbin, the frame arms extending in the axial direction of the bobbin from an outer periphery of the frame end wall, and an internal thread hole extending through the frame end wall. The fixed iron core is threaded to the internal thread hole. A tubular projection protrudes from an end face of the frame end wall that is on a side opposite to the bobbin, the projection forming part of the internal thread hole. The molded plastic part includes a molded end wall that covers the frame end wall and a molded peripheral wall that extends from an outer periphery of the molded end wall along the two frame arms so as to integrate the two frame arms, the bobbin, and the coil together. The molded end wall includes a connecting hole that is continuous with the internal thread hole. The connecting hole includes a groove in an inner circumferential surface. The groove extends along an outer circumferential surface of the projection.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An electromagnetic valve 10 according to one embodiment will now be described with reference to FIGS. 1 to 7.

Figure 1:
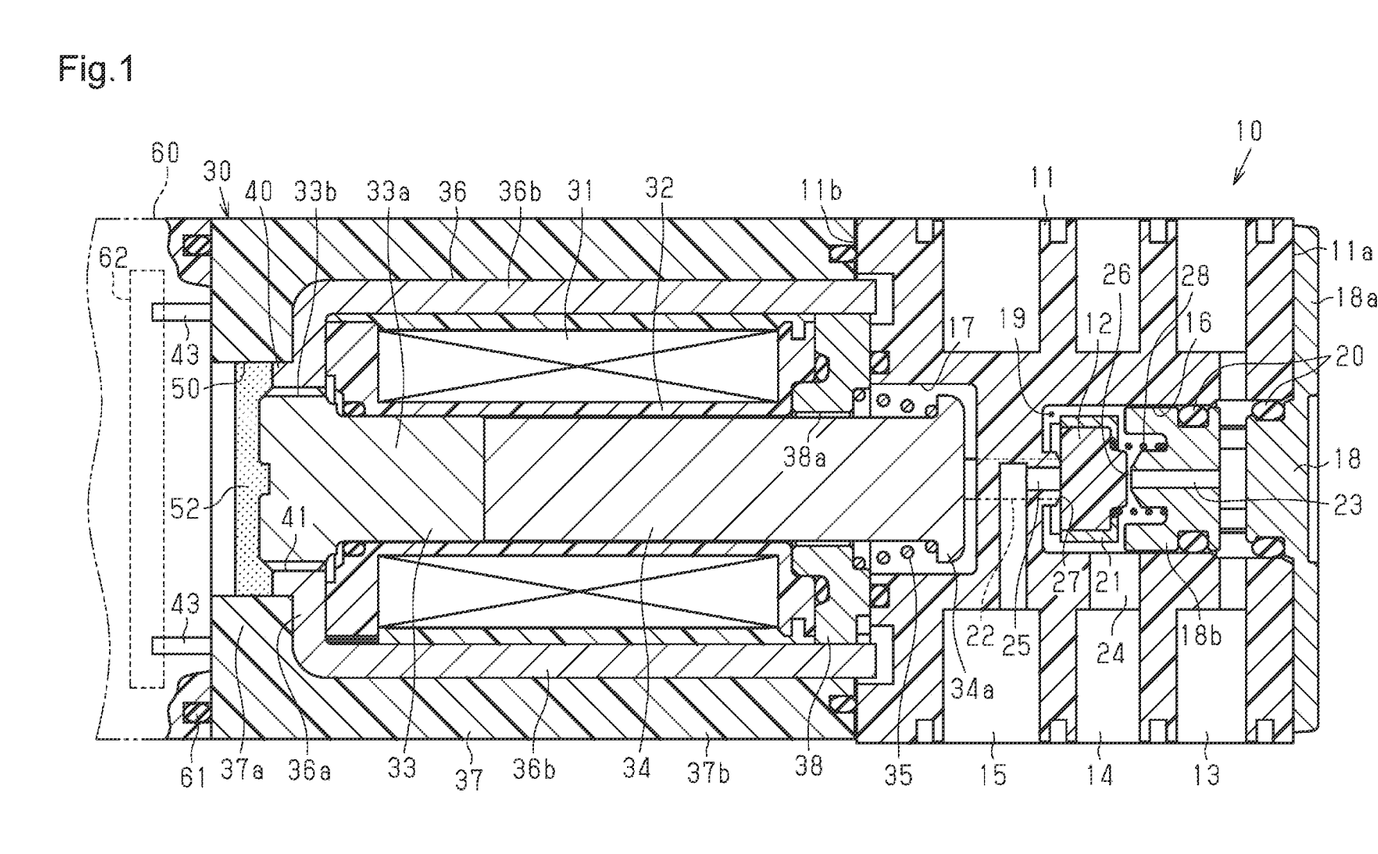
FIG. 1 is a cross-sectional view showing an electromagnetic valve according to one embodiment.

As shown in FIG. 1, the electromagnetic valve 10 includes a rectangular block-shaped body 11. The body 11 is made of a non-magnetic material. The body 11 is made of, for example, plastic. The electromagnetic valve 10 includes a valve member 12, which switches passages provided in the body 11, and a solenoid unit 30, which moves the valve member 12.

The body 11 includes a supply port 13, an output port 14, and a discharge port 15 in a side. The supply port 13 is connected to a positive pressure supply source (not shown) by piping (not shown). The output port 14 is connected to a pneumatic apparatus (not shown) by piping (not shown). The discharge port 15 is connected to the outside of the body 11 by piping (not shown).

The body 11 includes a first recess 16 in a first end face 11a. The first recess 16 is a circular hole. Also, the body 11 includes a second recess 17 in a second end face 11b. The second recess 17 is a circular hole. An axis of the second recess 17 agrees with an axis of the first recess 16.

A plug 18 is attached to the first end face 11a of the body 11. The plug 18 includes a flat plate-shaped attachment portion 18a and a tubular portion 18b, which has a circular cross-sectional shape. The tubular portion 18b projects from a central part of the attachment portion 18a. The tubular portion 18b is inserted into the first recess 16. The attachment portion 18a is attached to the first end face 11a of the body 11. The first recess 16 and the tubular portion 18b of the plug 18 define a valve chamber 19. Seal portions 20 provide a seal between the plug 18 and the body 11.

The valve member 12 is accommodated in the valve chamber 19. Also, the valve chamber 19 accommodates a valve guide 21. The valve guide 21 is arranged around the valve member 12 to guide the valve member 12. The valve guide 21 is tubular. The valve guide 21 has two extensions 22. The extensions 22 project from an end face of the valve guide 21 that is opposed to an inner end face of the first recess 16. The extensions 22 extend through the body 11 to project into the second recess 17. For the illustrative purposes, only one of the two extensions 22 is shown in FIG. 1.

The electromagnetic valve 10 has a supply passage 23, an output passage 24, and a discharge passage 25. The supply passage 23 extends through the tubular portion 18b of the plug 18 and the body 11 and connects the supply port 13 to the valve chamber 19. The supply passage 23 has an open end in the distal end face of the tubular portion 18b of the plug 18 so as to be connected to the valve chamber 19. The output passage 24 extends through the body 11 and connects the output port 14 to the valve chamber 19. The output passage 24 has an open end in the inner circumferential surface of the first recess 16 to be connected to the valve chamber 19. The discharge passage 25 extends through the body 11 and connects the discharge port 15 to the valve chamber 19. The discharge passage 25 has an open end in the inner end face of the first recess 16 to be connected to the valve chamber 19.

The plug 18 includes a supply valve seat 26. The supply valve seat 26 is provided around the open end of the supply passage 23, which opens in the distal end face of the tubular portion 18b of the plug 18. The valve member 12 can be seated on the supply valve seat 26. The body 11 includes a discharge valve seat 27. The discharge valve seat 27 is provided around the open end of the discharge passage 25, which opens in the inner end face of the first recess 16 of the body 11. The valve member 12 can be seated on the discharge valve seat 27. The valve member 12 is configured to contact and separate from each of the supply valve seat 26 and the discharge valve seat 27. The valve member 12 moves integrally with the valve guide 21.

The electromagnetic valve 10 includes a valve member spring 28. The valve member spring 28 is accommodated in the valve chamber 19. The valve member spring 28 is arranged between the valve member 12 and the plug 18 in the valve chamber 19. The valve member spring 28 urges the valve member 12 toward the discharge valve seat 27.

The solenoid unit 30 includes a coil 31, a bobbin 32, a fixed iron core 33, a movable iron core 34, an urging spring 35, a magnetic frame 36, a molded plastic part 37, and a magnetic member 38.

The bobbin 32 is tubular. In the present embodiment, the bobbin 32 has a circular cross-sectional shape. The bobbin 32 is made of plastic. Opposite ends of the bobbin 32 in an axial direction include a first end that is farther from the body 11, and a second end that is closer to the body 11. The coil 31 is wound around the bobbin 32. The fixed iron core 33 is columnar and made of a magnetic material. The fixed iron core 33 includes a shaft portion 33a and an external thread portion 33b. The shaft portion 33a is located in the bobbin 32 at a position closer to the first end of the bobbin 32. An axis of the shaft portion 33a agrees with an axis of the bobbin 32. The external thread portion 33b is continuous with a first end of the shaft portion 33a. The external thread portion 33b projects from the first end of the bobbin 32.

The movable iron core 34 is columnar and made of a magnetic material. The movable iron core 34 is inserted into the bobbin 32 through the second end of the bobbin 32. An axis of the movable iron core 34 agrees with an axis of the bobbin 32. The movable iron core 34 is adjacent to the fixed iron core 33 in the axial direction of the bobbin 32. The movable iron core 34 includes a projecting end, which projects from the second end of the bobbin 32 on a side opposite to the fixed iron core 33. The movable iron core 34 includes a flange 34a. The flange 34a extends radially outward from the projecting end of the movable iron core 34.

Figure 2:
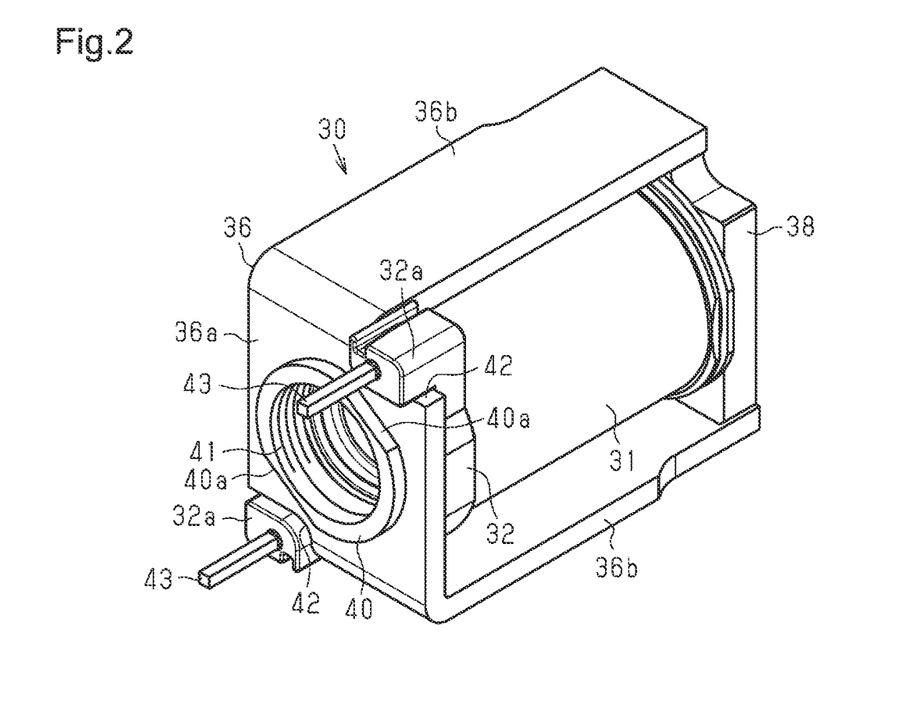
FIG. 2 is a perspective view showing a part of a solenoid unit of the electromagnetic valve shown in FIG. 1.

As shown in FIGS. 1 and 2, the magnetic frame 36 includes a frame end wall 36a and two frame arms 36b. The frame end wall 36a has the shape of a rectangular flat plate. The frame end wall 36a is adjacent to the first end of the bobbin 32 in the axial direction of the bobbin 32. The magnetic frame 36 is positioned with respect to the bobbin 32 with the thickness direction of the frame end wall 36a agreeing with the axial direction of the bobbin 32.

The frame end wall 36a includes an inner-side end face, which faces the bobbin 32, and an outer-side end face, which faces away from the bobbin 32. A projection 40 projects from the outer-side end face of the frame end wall 36a. The projection 40 is annular or tubular. In the present embodiment, the projection 40 has a circular cross-sectional shape.

An outer circumferential surface of the projection 40 includes two flat surfaces 40a, which extend parallel with each other. The two flat surfaces 40a are arranged on a line that is orthogonal to the axis of the projection 40 and on opposite sides of the axis of the projection 40. In the present embodiment, the line that is orthogonal to the axis of the projection 40 and on which the flat surfaces 40a are arranged is a diagonal line that connects two corners of the frame end wall 36a, which is substantially rectangular. That is, the two flat surfaces 40a are arranged at positions that correspond to two diagonal corners of the frame end wall 36a, which is substantially rectangular. The magnetic frame 36 also has an internal thread hole 41. The internal thread hole 41 extends through the frame end wall 36a in the thickness direction. The projection 40 is part of the internal thread hole 41. The interior of the internal thread hole 41 and the interior of the bobbin 32 are continuous with each other. An axis of the internal thread hole 41 agrees with the axis of the bobbin 32. The external thread portion 33b of the fixed iron core 33 is threaded to the internal thread hole 41. The fixed iron core 33 is fixed to the magnetic frame 36 by inserting the shaft portion 33a into the bobbin 32 through the internal thread hole 41 and threading the external thread portion 33b to the internal thread hole 41.

Figure 3:
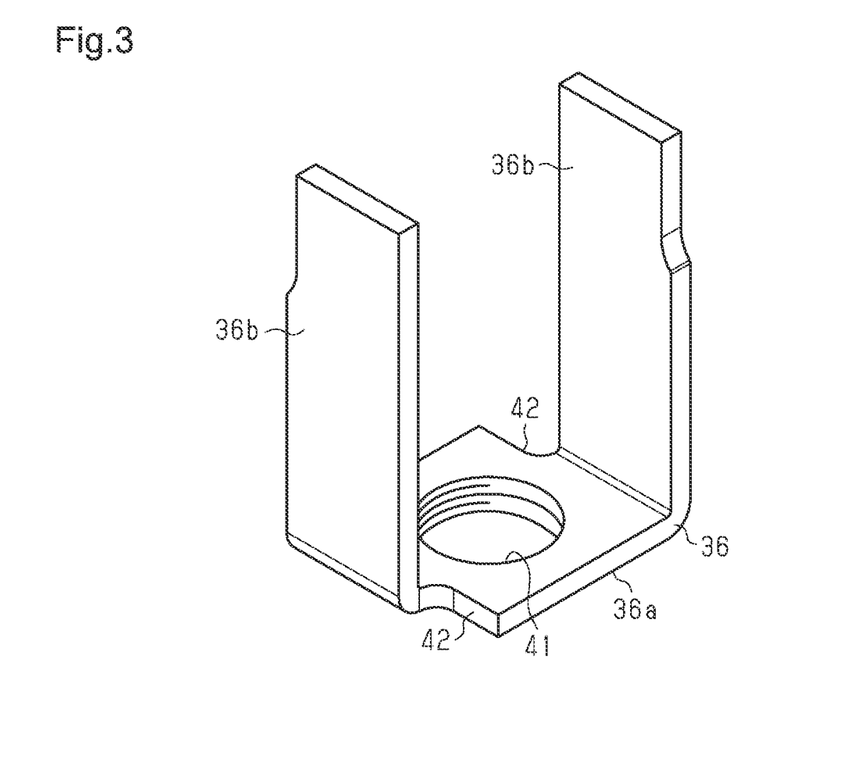
FIG. 3 is a perspective view of a magnetic frame shown in FIG. 2.

As shown in FIGS. 2 and 3, the frame end wall 36a includes two cutouts 42. The two cutouts 42 are arranged on a line orthogonal to the axis of the internal thread hole 41 and on opposite sides of the axis of the internal thread hole 41. In the present embodiment, the two cutouts 42 are located at two diagonal corners of the frame end wall 36a, which is substantially rectangular.

The two frame arms 36b each have the shape of a thin plate. The two frame arms 36b extend in parallel from the outer periphery of the frame end wall 36a. The thickness directions of the frame arms 36b agree with each other and are orthogonal to the thickness direction of the frame end wall 36a. The frame arms 36b extend from two of the four outer edges of the frame end wall 36a. Specifically, the frame arms 36b extend from the outer edges that are on opposite sides of the internal thread hole 41. The frame arms 36b are located on the outer side of the bobbin 32 and extend in the axial direction of the bobbin 32 from the outer periphery of the frame end wall 36a. Therefore, the magnetic frame 36 is located on the outer side of the bobbin 32. As shown in FIG. 3, the frame arms 36b have shapes that are symmetrical with respect to the axis of the internal thread hole 41.

As shown in FIG. 2, terminal holders 32a protrude from an end face of the bobbin 32 that is adjacent to the frame end wall 36a. The terminal holders 32a are formed integrally with the bobbin 32. The two terminal holders 32a are respectively engaged with the two cutouts 42. Thus, the terminal holders 32a are engaged with the frame end wall 36a at positions that are on a line orthogonal to the axis of the internal thread hole 41 and on opposite sides of the axis of the internal thread hole 41. In the present embodiment, the two terminal holders 32a are engaged with the frame end wall 36a at two diagonal corners of the frame end wall 36a, which is substantially rectangular. A distal end face of each terminal holder 32a protrudes further than the outer-side end face of the frame end wall 36a. A terminal 43 projects from each of the terminal holders 32a. The terminals 43 are electrically connected to the coil 31.

As shown in FIG. 1, the molded plastic part 37 has the shape of a rectangular block. The molded plastic part 37 is made of, for example, a thermoplastic resin. The molded plastic part 37 includes a molded end wall 37a and a molded peripheral wall 37b. The molded end wall 37a covers the frame end wall 36a. Specifically, the molded end wall 37a covers the outer-side end face of the frame end wall 36a. Each terminal 43 extends through the molded end wall 37a and projects from the molded end wall 37a.

The molded end wall 37a has a circular connecting hole 50. The connecting hole 50 is continuous with the internal thread hole 41. The axis of the connecting hole 50 agrees with the axis of the internal thread hole 41. The diameter of the connecting hole 50 is larger than the outer diameter of the projection 40. The inner circumferential surface of the connecting hole 50 extends along the outer circumferential surface of the projection 40. The distal end face of the projection 40 is located inside the connecting hole 50.

Figure 4:
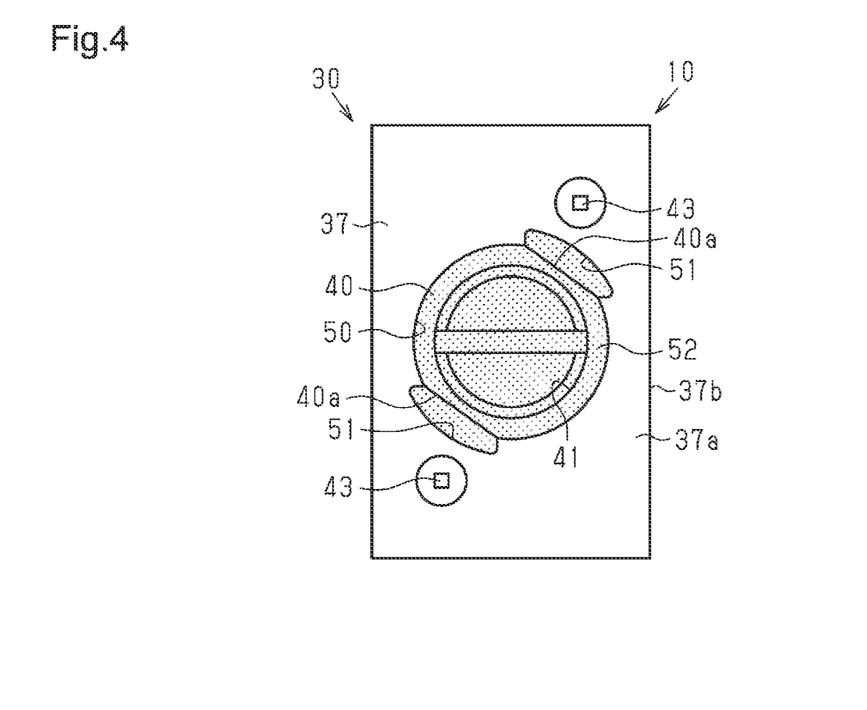
FIG. 4 is a front view of the solenoid unit shown in FIG. 1.

As shown in FIG. 4, the connecting hole 50 has two grooves 51 in its inner circumferential surface. The two grooves 51 respectively extend along the two flat surfaces 40a of the projection 40. The two grooves 51 have equal circumferential lengths. The two grooves 51 are arranged on a line that is orthogonal to the axis of the connecting hole 50 and on opposite sides of the axis of the connecting hole 50. In the present embodiment, the two grooves 51 are arranged at positions that correspond to two diagonal corners of the molded end wall 37a, which is substantially rectangular. Adhesive 52 is provided in the connecting hole 50. Some of the adhesive 52 in the connecting hole 50 fills the grooves 51. The molded plastic part 37 and a section of the outer circumferential surface of the projection 40 are bonded to each other by the adhesive 52 filling the grooves 51. This prevents the magnetic frame 36 from rotating about the axis of the internal thread hole 41.

As shown in FIG. 1, the molded peripheral wall 37b extends from the outer periphery of the molded end wall 37a along the two frame arms 36b. The molded peripheral wall 37b partially extends along the outer surface of each of the frame arms 36b. Each of the frame arms 36b includes a proximal end connected to the frame end wall 36a and a distal end that is on the side opposite to the proximal end. The molded peripheral wall 37b includes a proximal end connected to the molded end wall 37a and a distal end that is on the side opposite to the proximal end. The distal ends of the frame arms 36b protrude from the distal end of the molded peripheral wall 37b. The molded peripheral wall 37b covers the entire coil 31 and the bobbin 32 from the radially outer side of the bobbin 32. Thus, the molded peripheral wall 37b is partially located between each of the frame arms 36b and the coil 31 and between each of the frame arms 36b and the bobbin 32. The molded peripheral wall 37b is integrated with the frame arms 36b, the bobbin 32, and the coil 31. Thus, the molded plastic part 37 is integrated with the magnetic frame 36, the bobbin 32, and the coil 31.

The magnetic member 38 has the shape of a rectangular flat plate. The magnetic member 38 has a through-hole 38a. The through-hole 38a extends through the magnetic member 38 in the thickness direction. The magnetic member 38 is adjacent to the second end of the bobbin 32 in the axial direction of the bobbin 32. The magnetic member 38 is located on the inner side of the distal ends of the frame arms 36b. The movable iron core 34 extends through the through-hole 38a.

The urging spring 35 is arranged between the magnetic member 38 and the flange 34a of the movable iron core 34. One end of the urging spring 35 is supported by the magnetic member 38, and the other end of the urging spring 35 is supported by the flange 34a of the movable iron core 34. The urging spring 35 urges the movable iron core 34 away from the fixed iron core 33. The urging force of the urging spring 35 is greater than the urging force of the valve member spring 28.

The solenoid unit 30 is positioned with respect to the body 11 by coupling the molded plastic part 37 to the body 11. The molded plastic part 37 is coupled to the body 11 such that an end of the movable iron core 34 that is on a side opposite to the fixed iron core 33 protrudes into the second recess 17. The extensions 22 of the valve member 12 are in contact with an end face of the movable iron core 34 that is on a side opposite to the fixed iron core 33.

An end of the molded plastic part 37 that is on a side opposite to the body 11 is coupled to a power supply unit 60. An annular seal member 61 provides a seal between the power supply unit 60 and the molded plastic part 37. The power supply unit 60 includes a circuit board 62. The terminals 43 are electrically connected to the circuit board 62. When the circuit board 62 supplies power to the coil 31 through the terminals 43, the coil 31 is excited so that magnetic flux is generated around the coil 31. The generated flux passes through the fixed iron core 33, the magnetic frame 36, the magnetic member 38, and the movable iron core 34 in the order. Thus, the magnetic frame 36 cooperates with the fixed iron core 33 and the movable iron core 34 so as to generate a magnetic circuit around the coil 31.

When the coil 31 is supplied with power, the coil 31 is excited so that magnetic flux is generated around the coil 31. At this time, the excitation of the coil 31 generates attractive force in the fixed iron core 33. The generated attractive force pulls the movable iron core 34 toward the fixed iron core 33 against the urging force of the urging spring 35. Thus, when power is supplied to the coil 31, attractive force is generated in the fixed iron core 33. The generated attractive force attracts the movable iron core 34 to the fixed iron core 33. The urging force of the valve member spring 28 thus moves the valve member 12 away from the supply valve seat 26, so that the valve member 12 is seated on the discharge valve seat 27. This opens the supply passage 23 and closes the discharge passage 25. Thus, the supply port 13 and the output port 14 are connected to each other through the supply passage 23, the valve chamber 19, and the output passage 24, and the connection between the output port 14 and the discharge port 15 through the output passage 24, the valve chamber 19, and the discharge passage 25 is interrupted.

When the supply of power to the coil 31 is stopped, the attractive force of the fixed iron core 33 generated by excitation of the coil 31 disappears. Accordingly, the movable iron core 34 is moved away from the fixed iron core 33 by the urging force of the urging spring 35. Then, the movable iron core 34 pushes the extensions 22, so that the valve member 12 is moved toward the supply valve seat 26 against the urging force of the valve member spring 28 and seated on the supply valve seat 26. This closes the supply passage 23 and opens the discharge passage 25. Thus, the output port 14 and the discharge port 15 are connected to each other through the output passage 24, the valve chamber 19, and the discharge passage 25, and the connection between the supply port 13 and the output port 14 through the supply passage 23, the valve chamber 19, and the output passage 24 is interrupted.

Figure 5:
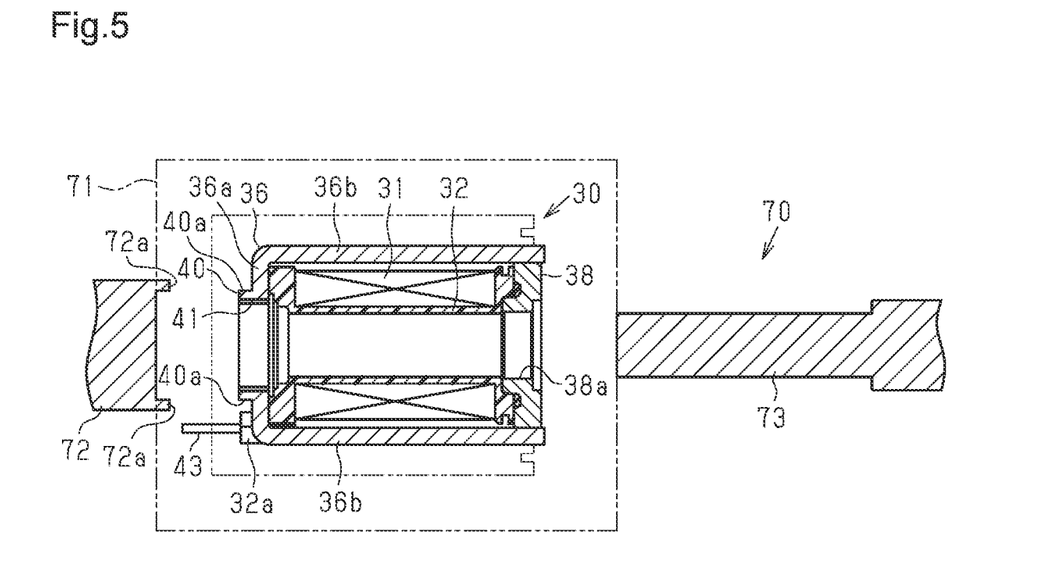
FIG. 5 is a cross-sectional view illustrating a procedure for injection molding a molded plastic part in the electromagnetic valve shown in FIG. 1.

As shown in FIG. 5, a mold 70 is used to form the molded plastic part 37 by injection molding. The mold 70 includes a mold body 71, a first jig 72, and a second jig 73. The first jig 72 is columnar and includes two holding portions 72a. The holding portions 72a protrude from an end face of the first jig 72. The holding portions 72a are plates each having an arcuate cross-sectional shape and have surfaces that extend along the flat surfaces 40a of the projection 40. The two holding portions 72a are arranged on a line that is orthogonal to the axis of the first jig 72 and on opposite sides of the axis of the first jig 72. The second jig 73 is columnar and can be inserted into the bobbin 32 through the through-hole 38a of the magnetic member 38. The second jig 73 is configured to close the through-hole 38a.

Figure 6:
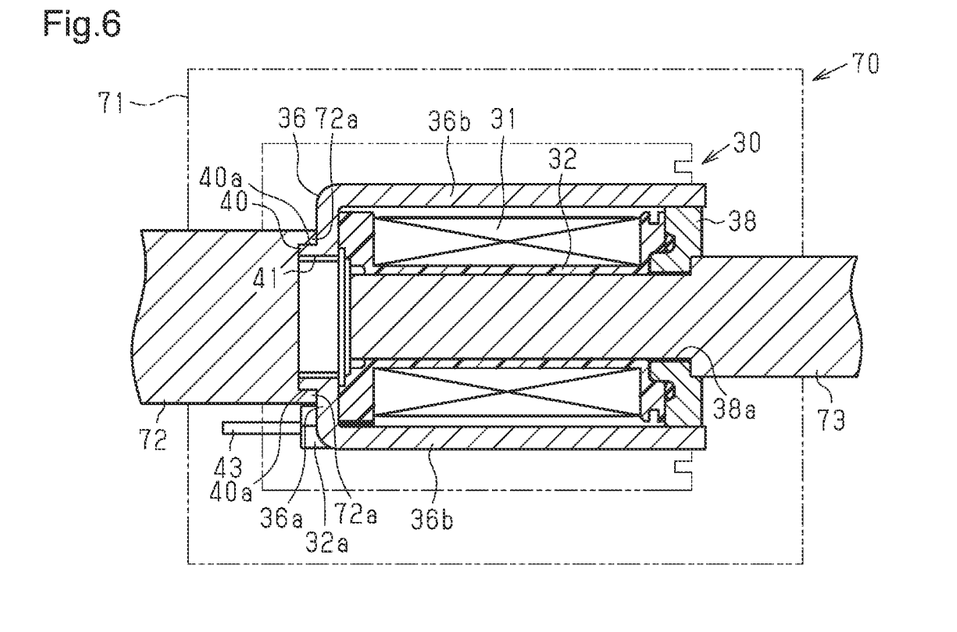
FIG. 6 is a cross-sectional view illustrating a procedure for injection molding a molded plastic part in the electromagnetic valve shown in FIG. 1.

As shown in FIG. 6, when the molded plastic part 37 is formed by injection molding, the magnetic frame 36, the bobbin 32, the coil 31, and the magnetic member 38 are first arranged at predetermined positions in the mold body 71. Next, the first jig 72 is arranged such that the holding portions 72a respectively contact the flat surfaces 40a of the projection 40. This positions the magnetic frame 36. The opening of the projection 40 is closed by an end face of the first jig 72. Further, the second jig 73 is inserted into the bobbin 32 through the through-hole 38a of the magnetic member 38. This determines the positions of the bobbin 32 and the magnetic member 38. The through-hole 38a is closed by the second jig 73.

Figure 7:
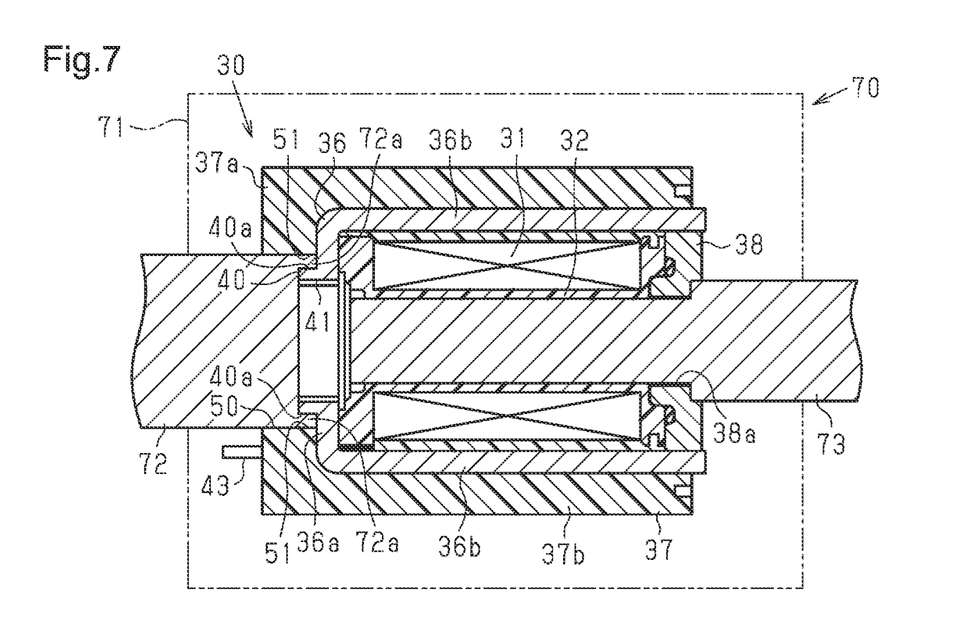
FIG. 7 is a cross-sectional view illustrating a procedure for injection molding a molded plastic part in the electromagnetic valve shown in FIG. 1.

As shown in FIG. 7, the mold body 71 is filled with molten plastic, which is then hardened to form the molded plastic part 37. The thus formed molded plastic part 37 integrates the magnetic frame 36, the bobbin 32, the coil 31, and the magnetic member 38.

Operation of the present embodiment will now be described.

When injection molding is performed to fill the mold body 71 with plastic in a state in which the magnetic frame 36, the bobbin 32, and the coil 31 are arranged in the mold body 71, the holding portions 72a, which are part of the mold 70, are brought into contact with outer circumferential surface of the projection 40. This prevents the magnetic frame 36 from being displaced from the predetermined position by the molding pressure of plastic in the mold body 71. As a result, the magnetic frame 36 is integrated with the bobbin 32 and the coil 31 by the molded plastic part 37 at the predetermined position. This stabilizes the magnetic circuit that is generated around the coil 31 by the magnetic frame 36 cooperating with the fixed iron core 33 and the movable iron core 34.

The above-described embodiment has the following advantages.

(1) The grooves 51 are formed in the inner circumferential surface of the connecting hole 50 so as to extend along the outer circumferential surface of the projection 40. The grooves 51 are formed by, for example, causing part of the mold 70 to contact the outer circumferential surface of the projection 40 when performing injection molding to fill the mold 70 with plastic with the magnetic frame 36, the bobbin 32, and the coil 31 arranged in the mold 70. Since part of the mold 70 is brought into contact with the outer circumferential surface of the projection 40 during the injection molding, the magnetic frame 36 is prevented from being displaced from the predetermined position by the molding pressure of plastic in the mold 70. As a result, the magnetic frame 36 is integrated with the bobbin 32 and the coil 31 by the molded plastic part 37 at the predetermined position. This stabilizes the magnetic circuit that is generated around the coil 31 by the magnetic frame 36 cooperating with the fixed iron core 33 and the movable iron core 34. Accordingly, the magnetic efficiency is improved so that a high attractive force is generated in the fixed iron core 33.

(2) The outer circumferential surface of the projection 40 includes the two flat surfaces 40a, which extend parallel with each other. The two grooves 51 respectively extend along the two flat surfaces 40a of the projection 40. Accordingly, when injection molding is performed to fill the mold body 70 with plastic with the magnetic frame 36, the bobbin 32, and the coil 31 arranged in the mold body 70, part of the mold 70 is brought into contact with the two flat surfaces 40a of the projection 40. This prevents the magnetic frame 36 from rotating about the axis of the internal thread hole 41 by the molding pressure of plastic in the mold 70. This further reliably prevents the magnetic frame 36 from being displaced from the predetermined position.

(3) The two flat surfaces 40a are arranged on a line that is orthogonal to the axis of the projection 40 and on opposite sides of the axis of the projection 40. Accordingly, when injection molding is performed to fill the mold body 70 with plastic with the magnetic frame 36, the bobbin 32, and the coil 31 arranged in the mold body 70, part of the mold 70 is brought into contact with part of the outer circumferential surface of the projection 40, specifically, sections that are on a line orthogonal to the axis of the projection 40 and on opposite sides of the axis of the projection 40. This further reliably prevents the magnetic frame 36 from being displaced from the predetermined position by the molding pressure of plastic in the mold 70.

(4) The frame arms 36b have shapes that are symmetrical with respect to the axis of the internal thread hole 41. Thus, as compared to a case in which the two frame arms 36b are asymmetrical with respect to the internal thread hole 41, even quantities of plastic can be provided to the areas surrounding the respective frame arms 36b when injection molding is performed to fill the mold body 70 with plastic with the magnetic frame 36, the bobbin 32, and the coil 31 arranged in the mold body 70. This prevents the stress caused by the molding pressure of plastic in the mold 70 from concentrating on one of the frame arms 36b. This prevents the magnetic frame 36 from being displaced from the predetermined position.

(5) The terminal holders 32a are engaged with the frame end wall 36a at positions that are on a line orthogonal to the axis of the internal thread hole 41 and on opposite sides of the axis of the internal thread hole 41. This accurately positions the magnetic frame 36 with respect to the bobbin 32.

(6) The adhesive 52 is provided in the connecting hole 50. With this configuration, some of the adhesive 52 in the connecting hole 50 fills the grooves 51. The adhesive 52 that fills the grooves 51 bonds the molded plastic part 37 and part of the outer circumferential surface of the projection 40 to each other. This prevents the magnetic frame 36 from rotating about the axis of the internal thread hole 41.

(7) The distal end face of the projection 40 is located inside the connecting hole 50. As compared to a case in which, for example, the distal end face of the projection 40 protrudes to the outside of the connecting hole 50, the adhesive 52 in the connecting hole 50 is likely to remain inside the connecting hole 50. This prevents some of the adhesive 52 in the connecting hole 50 from flowing out from the connecting hole 50.

(8) Since the present embodiment prevents the magnetic frame 36 from being displaced from the predetermined position, the insulation distance between the magnetic frame 36 and the coil 31 is ensured.

(9) The present embodiment allows even quantities of plastic to be provided to the areas surrounding the respective frame arms 36b when injection molding is performed. This prevents the stress caused by the molding pressure of plastic from acting on the coil 31 in a concentrated manner.

(10) The projection 40 forms part of the internal thread hole 41, to which the fixed iron core 33 is threaded. Thus, compared to a case in which the frame end wall 36a is not formed in the projection 40, the area of the magnetic circuit between the magnetic frame 36 and the fixed iron core 33 is increased. This improves the magnetic efficiency.

The above-described embodiment may be modified as follows. The above-described embodiment and the following modifications can be combined as long as the combined modifications remain technically consistent with each other.

In the above-described embodiment, the outer circumferential surface of the projection 40 does not necessarily include the flat surfaces 40a, which extend parallel with each other. Instead, the outer circumferential surface of the projection 40 may be circular.

In the above-described embodiment, the flat surfaces 40a do not necessarily need to be arranged on a line that is orthogonal to the axis of the projection 40 and on opposite sides of the axis of the projection 40.

In the above-described embodiment, the frame arms 36b may have shapes that are asymmetrical with respect to the axis of the internal thread hole 41.

In the above-described embodiment, the distal end face of each terminal holder 32a does not necessarily need to protrude further than the outer-side end face of the frame end wall 36a.

In the above-described embodiment, the terminal holders 32a do not necessarily need to be engaged with the frame end wall 36a.

In the above-described embodiment, the connecting hole 50 does not necessarily need to be provided with the adhesive 52.

In the above-described embodiment, the distal end face of the projection 40 may protrude to the outside of the connecting hole 50.

In the above-described embodiment, the connecting hole 50 may have three or more grooves 51 in the inner circumferential surface.

In the above-described embodiment, the grooves 51 may extend over the entire inner circumferential surface of the connecting hole 50.

The term "annular" as used in this description may refer to any structure that forms a loop as a whole. "Annular" shapes include but are not limited to a circular shape, an elliptic shape, and a polygonal shape with sharp or rounded corners. "Tubular" shapes include may refer to but are not limited to any structure having circular cross-sectional shape, an elliptic cross-sectional shape, and a polygonal cross-sectional shape with sharp or rounded corners. In the embodiment, the projection 40 may have a shape of a rectangular tube.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An electromagnetic valve, comprising:
   a body including passages;
   a valve member configured to switch the passages; and
   a solenoid unit configured to move the valve member, wherein
   the solenoid unit includes:
      a coil;
      a tubular bobbin about which the coil is wound;
      a fixed iron core arranged on an inner side of the bobbin;
      a movable iron core configured to be attracted to the fixed iron core by attractive force that is generated in the fixed iron core when power is supplied to the coil;
      an urging spring configured to urge the movable iron core away from the fixed iron core;
      a magnetic frame located on an outer side of the bobbin, the magnetic frame cooperating with the fixed iron core and the movable iron core so as to generate a magnetic circuit around the coil; and
      a molded plastic part that integrates the magnetic frame, the bobbin, and the coil together,
   the magnetic frame includes:
      a frame end wall that is adjacent to the bobbin in an axial direction of the bobbin;
      two frame arms located on the outer side of the bobbin, the two frame arms extending in an axial direction of the bobbin from an outer periphery of the frame end wall; and
      an internal thread hole extending through the frame end wall, the fixed iron core being threaded to the internal thread hole,
   a tubular projection protrudes from an end face of the frame end wall that is on a side opposite to the bobbin, the projection forming part of the internal thread hole,
   the molded plastic part includes:
      a molded end wall that covers the frame end wall; and
      a molded peripheral wall that extends from an outer periphery of the molded end wall along the two frame arms so as to integrate the two frame arms, the bobbin, and the coil together,
   the molded end wall includes a connecting hole that is continuous with the internal thread hole, and
   the connecting hole includes a groove in an inner circumferential surface, the groove extending along an outer circumferential surface of the projection.

2. The electromagnetic valve according to claim 1, wherein the two frame arms have shapes that are symmetrical with respect to an axis of the internal thread hole.

3. The electromagnetic valve according to claim 1, wherein
   two terminal holders protrude from an end face of the bobbin that is adjacent to the frame end wall, and
   the two terminal holders are engaged with the frame end wall at positions that are on a line orthogonal to an axis of the internal thread hole and on opposite sides of the axis of the internal thread hole.

4. The electromagnetic valve according to claim 1, wherein
   the groove includes two grooves in the inner circumferential surface of the connecting hole,
   the outer circumferential surface of the projection includes two flat surfaces, the two flat surfaces extending parallel with each other, and
   the two grooves respectively extend along the two flat surfaces.

5. The electromagnetic valve according to claim 4, wherein the two flat surfaces are arranged on a line that is orthogonal to an axis of the projection and on opposite sides of the axis of the projection.

6. The electromagnetic valve according to claim 1, wherein adhesive is provided in the connecting hole.

7. The electromagnetic valve according to claim 6, wherein a distal end face of the projection is located inside the connecting hole.

* * * * *